United States Patent [19]

Moriwake et al.

[11] Patent Number: 5,644,284

[45] Date of Patent: *Jul. 1, 1997

[54] TEMPERATURE SENSOR

[75] Inventors: Hiroki Moriwake, Sanda; Tsuyoshi Tanaka, Neyagawa; Masayuki Takahashi, Sapporo, all of Japan

[73] Assignee: Matsushita Electric Industrial Co., Ltd., Osaka, Japan

[*] Notice: The term of this patent shall not extend beyond the expiration date of Pat. No. 5,497,139.

[21] Appl. No.: 428,577

[22] Filed: Apr. 25, 1995

[30] Foreign Application Priority Data

Apr. 27, 1994 [JP] Japan .................................. 6-089580
Jun. 3, 1994 [JP] Japan .................................. 6-122458

[51] Int. Cl.⁶ ...................................................... H01C 7/10
[52] U.S. Cl. .................................. 338/22 R; 338/225 D; 252/518; 252/519; 252/520; 252/521
[58] Field of Search ............................ 338/22 R, 225 D, 338/28; 252/518–521, 512; 437/918; 427/101

[56] References Cited

U.S. PATENT DOCUMENTS

| | | | |
|---|---|---|---|
| 3,670,216 | 6/1972 | Masuyama et al. | 252/519 |
| 3,958,209 | 5/1976 | Soda et al. | 338/22 R |
| 3,962,145 | 6/1976 | Matsuo et al. | 252/519 |
| 4,013,592 | 3/1977 | Matsuoka et al. | 252/521 |
| 4,324,702 | 4/1982 | Matsuo et al. | 252/519 |
| 4,891,158 | 1/1990 | Hata | 252/520 |
| 5,476,822 | 12/1995 | Iwaya et al. | 501/152 |
| 5,497,139 | 3/1996 | Takahashi et al. | 338/22 R |

FOREIGN PATENT DOCUMENTS

| | | | |
|---|---|---|---|
| 7421112 | 12/1973 | France . | |
| 51-11196 | 1/1976 | Japan . | |
| 52-95093 | 8/1977 | Japan . | |
| 0072158 | 6/1978 | Japan | 338/22 R |
| 53-135496 | 11/1978 | Japan . | |
| 0138096 | 12/1978 | Japan | 338/22 R |
| 0104599 | 8/1979 | Japan | 338/22 SD |
| 0159694 | 12/1979 | Japan | 252/521 |
| 401289206 | 11/1989 | Japan | 338/22 SD |
| 32356 | 1/1991 | Japan . | |
| 4-285048 | 10/1992 | Japan . | |
| 405275206 | 10/1993 | Japan | 338/22 R |
| 6283310 | 10/1994 | Japan . | |
| 7037707 | 2/1995 | Japan . | |
| 1434033 | 4/1976 | United Kingdom | 338/22 R |

OTHER PUBLICATIONS

Search Report for European Appl. 95106166.2, Mailed Sep. 20, 1995.

*Primary Examiner*—Teresa J. Walberg
*Assistant Examiner*—Karl Easthon
*Attorney, Agent, or Firm*—Renner, Otto, Boisselle & Sklar

[57] ABSTRACT

An oxide composition including $(Al_{1-x-y}Cr_xFe_y)_2O_3$ and prescribed amounts of Mn or Mg, is provided. A temperature sensor including a heat-resistant cap, a thermistor element accommodated in the heat-resistant cap, and a pair of lead wires electrically connected to each other via the thermistor element and extending outside the heat-resistant cap is also provided, the thermistor element including the above-mentioned oxide composition.

10 Claims, 1 Drawing Sheet

TEMPERATURE SENSOR

BACKGROUND OF THE INVENTION

1. Field of the Invention

The present invention relates to a temperature sensor, and particularly to a temperature sensor having a high accuracy in high-temperature regions.

2. Description of the Related Art

In recent years, catalysts for exhaust gas have been employed in an effort to cope with environmental hazards and the like presented by exhaust gas of automobiles. Such catalysts require accurate measurement of exhaust gas temperature in order to maximize their performance. Therefore, a temperature sensor which is highly accurate especially in high-temperature regions has been desired.

Figure 1:
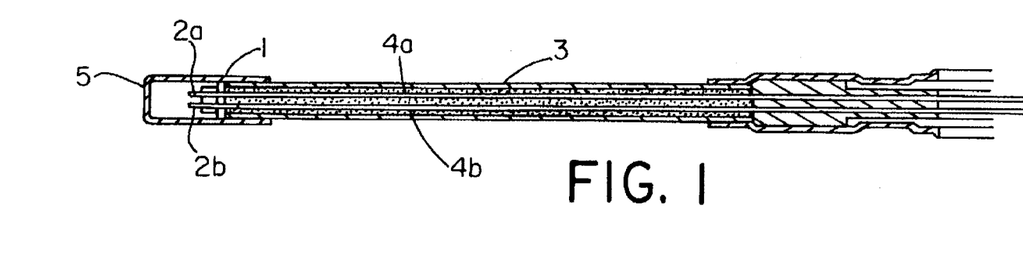
FIG. 1 is a cross-sectional view showing a configuration for a temperature sensor.
Figure 2:
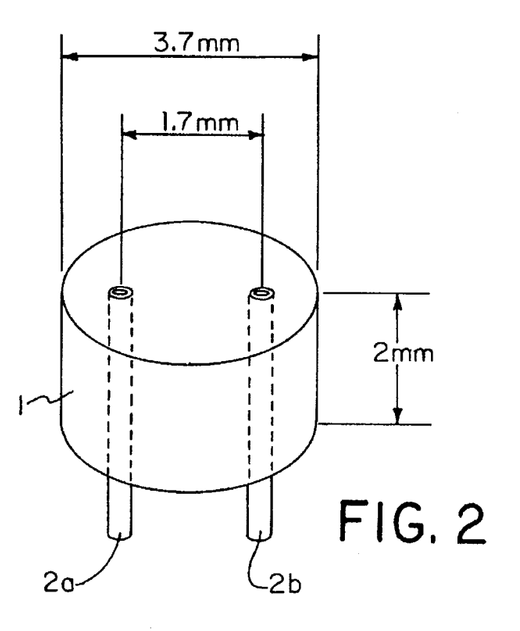
FIG. 2 is a perspective view showing a thermistor element to be used for a temperature sensor.

FIG. 1 shows an exemplary configuration for a temperature sensor. The temperature sensor includes a thermistor element 1 sealed in a heat-resistant cap 5. As shown in FIG. 2, Pt (platinum) pipes 2a and 2b are inserted into the thermistor element 1, the Pt pipes 2a and 2b being sintered with the thermistor 1 in an integral manner. Lead wires 4a and 4b of a dual-core pipe 3 are welded to the Pt pipes 2a and 2b. Thus, the lead wires 4a and 4b extend from the heat-resistant cap 5.

In order to obtain a highly accurate temperature sensor, a large thermistor constant B is desired, the thermistor constant B representing the resistance temperature characteristics of the thermistor element 1. The thermistor constant B is defined by Equation 1 shown below. A larger value of the constant B indicates a larger change in the resistance value of the thermistor in response to temperature changes.

$$B=[ln(R_1)-ln(R_2)]/(1/T_1-1/T_2) \; (K) \qquad \text{Eq. 1}$$

where $T_1$ represents a temperature (K);

$T_2$ represents a temperature not equal to $T_1$ (K);

$R_1$ represents a resistance value ($\Omega$) of the thermistor at temperature $T_1$ (K); and $R_2$ represents a resistance value ($\Omega$) of the thermistor at temperature $T_2$ (K).

In order to increase the reliability of the measurement, it is preferable that the resistance value of the thermistor element has little change over time.

Conventionally, a thermistor element for a temperature sensor for high-temperature use where the maximum working temperature (i.e., the maximum temperature at which the temperature sensor is used) exceeds 700° C. is typically composed of a corundum type thermistor material such as (Al, Cr, Fe)$_2$O$_3$. However, such conventional thermistor elements have a low constant B, e.g., 5000 K. in the temperature range between 300° C. to 900° C., indicative of inappropriateness for temperature measurement in such relatively high temperature regions. Also, it has been impossible to attain a high constant B value in a broad range of working temperatures although it has been possible to obtain a high constant B value at a specific working temperature.

Consequently, there has been desired a temperature sensor which attains a high constant B value in a broad range of relatively high temperatures and therefore has a high accuracy. In particular, a temperature sensor is desired in which the resistance value has little change over time during high-temperature use and therefore has high measurement reliability. Accordingly, there has been a strong demand for thermistor materials for thermistor elements to be used for such high-temperature sensors.

SUMMARY OF THE INVENTION

An oxide composition according to the present invention includes elements in amounts represented by the following formula:

$(Al_{1-x-y}Cr_xFe_y)_2O_3+a$ atm. % Mn $0.05 \leq x+y \leq 0.95$ $0.05 \leq y/(x+y) \leq 0.8$ $0.1 \leq a \leq 10$ where a represents a value based on one molecule of $(Al_{1-x-y}Cr_xFe_y)_2O_3$.

In one embodiment of the invention, the oxide composition includes elements in amounts represented by the following formula:

$(Al_{1-x-y}Cr_xFe_y)_2O_3+a$ atm. % Mn+$b$ atm. % Ca $0.05 \leq x+y \leq 0.95$ $0.05 \leq y/(x+y) \leq 0.8$ $0.1 \leq a \leq 10$ $0.1 \leq b \leq 5$ where a and b represent values based on one molecule of $(Al_{1-x-y}Cr_xFe_y)_2O_3$.

In another embodiment of the invention, the oxide composition includes elements in amounts represented by the following formula:

$(Al_{1-x-y}Cr_xFe_y)_2O_3+a$ atm. % Mn+$b$ atm. % Ca+$c_1$ atm. % rare earth elements $0.05 \leq x+y \leq 0.95$ $0.05 \leq y/(x+y) \leq 0.8$ $0.1 \leq a \leq 10$ $0.1 \leq b \leq 5$ $0.1 \leq c_1 \leq 10$ where a, b, and $c_1$ represent values based on one molecule of $(Al_{1-x-y}Cr_xFe_y)_2O_3$.

In still another embodiment of the invention, the oxide composition includes elements in amounts represented by the following formula:

$(Al_{1-x-y}Cr_xFe_y)_2O_3+a$ atm. % Mn+$b$ atm. % Ca+$c_1$ atm. % Th $0.05 \leq x+y \leq 0.95$ $0.05 \leq y/(x+y) \leq 0.8$ $0.1 \leq a \leq 10$ $0.1 \leq b \leq 5$ $0.01 \leq c_2 \leq 10$ where a, b, and $c_2$ represent values based on one molecule of $(Al_{1-x-y}Cr_xFe_y)_2O_3$.

In still another embodiment of the invention, the oxide composition includes elements in amounts represented by the following formula:

$(Al_{1-x-y}Cr_xFe_y)_2O_3 + a$ atm. % Mn + $b$ atm. % Ca + $c_3$ atm. % Zr $0.05 \leq x+y \leq 0.95$ $0.05 \leq y/(x+y) \leq 0.8$ $0.1 \leq a \leq 10$ $0.1 \leq b \leq 5$ $0.1 \leq c_3 \leq 30$ where a, b, and $c_3$ represent values based on one molecule of $(Al_{1-x-y}Cr_xFe_y)_2O_3$.

Alternatively, the oxide composition according to the present invention includes elements in amounts represented by the following formula:

$(Al_{1-x-y}Cr_xFe_y)_2O_3 + a$ atm. % Mg $0.05 \leq x+y \leq 0.95$ $0.05 \leq y/(x+y) \leq 0.8$ $0.1 \leq a \leq 10$ where a represents a value based on one molecule of $(Al_{1-x-y}Cr_xFe_y)_2O_3$.

In one embodiment of the invention, the oxide composition includes elements in amounts represented by the following formula:

$(Al_{1-x-y}Cr_xFe_y)_2O_3 + a$ atm. % Mg + $b$ atm. % Ca $0.05 \leq x+y \leq 0.95$ $0.05 \leq y/(x+y) \leq 0.8$ $0.1 \leq a \leq 10$ $0.1 \leq b \leq 5$ where a and b represent values based on one molecule of $(Al_{1-x-y}Cr_xFe_y)_2O_3$.

In another embodiment of the invention, the oxide composition includes elements in amounts represented by the following formula:

$(Al_{1-x-y}Cr_xFe_y)_2O_3 + a$ atm. % Mg + $b$ atm. % Ca + $c_1$ atm. % rare earth elements $0.05 \leq x+y \leq 0.95$ $0.05 \leq y/(x+y) \leq 0.8$ $0.1 \leq a \leq 10$ $0.1 \leq b \leq 5$ $0.1 \leq c_1 \leq 10$ where a, b, and $c_1$ represent values based on one molecule of $(Al_{1-x-y}Cr_xFe_y)_2O_3$.

In still another embodiment of the invention, the oxide composition includes elements in amounts represented by the following formula:

$(Al_{1-x-y}Cr_xFe_y)_2O_3 + a$ atm. % Mg + $b$ atm. % Ca + $c_2$ atm. % Th $0.05 \leq x+y \leq 0.95$ $0.05 \leq y/(x+y) \leq 0.8$ $0.1 \leq a \leq 10$ $0.1 \leq b \leq 5$ $0.01 \leq c_2 \leq 10$ where a, b, and $c_2$ represent values based on one molecule of $(Al_{1-x-y}Cr_xFe_y)_2O_3$.

In still another embodiment of the invention, the oxide composition includes elements in amounts represented by the following formula:

$(Al_{1-x-y}Cr_xFe_y)_2O_3 + a$ atm. % Mg + $b$ atm. % Ca + $c_3$ atm. % Zr + $d$ atm. % Hf $0.05 \leq x+y \leq 0.95$ $0.05 \leq y/(x+y) \leq 0.8$ $0.1 \leq a \leq 10$ $0.1 \leq b \leq 5$ $0.1 \leq c_3+d \leq 30$ where a, b, $c_3$, and d represent values based on one molecule of $(Al_{1-x-y}Cr_xFe_y)_2O_3$.

A temperature sensor according to the present invention includes a heat-resistant cap, a thermistor element accommodated in the heat-resistant cap, and a pair of lead wires electrically connected to each other via the thermistor element and extending outside the heat-resistant cap, wherein the thermistor element includes an oxide composition including elements in amounts represented by the following formula:

$(Al_{1-x-y}Cr_xFe_y)_2O_3 + a$ atm. % Mn $0.05 \leq x+y \leq 0.95$ $0.05 \leq y/(x+y) \leq 0.8$ $0.1 \leq a \leq 10$ where a represents a value based on one molecule of $(Al_{1-x-y}Cr_xFe_y)_2O_3$.

In one embodiment of the invention, the oxide composition includes elements in amounts represented by the following formula:

$(Al_{1-x-y}Cr_xFe_y)_2O_3 + a$ atm. % Mn + $b$ atm. % Ca $0.05 \leq x+y \leq 0.95$ $0.05 \leq y/(x+y) \leq 0.8$ $0.1 \leq a \leq 10$ $0.1 \leq b \leq 5$ where a and b represent values based on one molecule of $(Al_{1-x-y}Cr_xFe_y)_2O_3$.

In another embodiment of the invention, the oxide composition includes elements in amounts represented by the following formula:

$(Al_{1-x-y}Cr_xFe_y)_2O_3 + a$ atm. % Mn+$b$ atm. % Ca+$c_1$ atm. % rare earth elements $0.05 \leq x+y \leq 0.95$ $0.05 \leq y/(x+y) \leq 0.8$ $0.1 \leq a \leq 10$ $0.1 \leq b \leq 5$ $0.1 \leq c_1 \leq 10$ where a, b, and $c_1$ represent values based on one molecule of $(Al_{1-x-y}Cr_xFe_y)_2O_3$.

In still another embodiment of the invention, the oxide composition includes elements in amounts represented by the following formula:

$(Al_{1-x-y}Cr_xFe_y)_2O_3 + a$ atm. % Mn+$b$ atm. % Ca+$c_2$ atm. % Th $0.05 \leq x+y \leq 0.95$ $0.05 \leq y/(x+y) \leq 0.8$ $0.1 \leq a \leq 10$ $0.1 \leq b \leq 5$ $0.01 \leq c_2 \leq 10$ where a, b, and $c_2$ represent values based on one molecule of $(Al_{1-x-y}Cr_xFe_y)_2O_3$.

In still another embodiment of the invention, the oxide composition includes elements in amounts represented by the following formula:

$(Al_{1-x-y}Cr_xFe_y)_2O_3 + a$ atm. % Mn+$b$ atm. % Ca+$c_3$ atm. % Zr $0.05 \leq x+y \leq 0.95$ $0.05 \leq y/(x+y) \leq 0.8$ $0.1 \leq a \leq 10$ $0.1 \leq b \leq 5$ $0.1 \leq c_3 \leq 30$ where a, b, and $c_3$ represent values based on one molecule of $(Al_{1-x-y}Cr_xFe_y)_2O_3$.

Alternatively, the temperature sensor according to the present invention includes a heat-resistant cap, a thermistor element accommodated in the heat-resistant cap, and a pair of lead wires electrically connected to each other via the thermistor element and extending outside the heat-resistant cap, wherein the thermistor element includes an oxide composition including elements in amounts represented by the following formula:

$(Al_{1-x-y}Cr_xFe_y)_2O_3 + a$ atm. % Mg $0.05 \leq x+y \leq 0.95$ $0.05 \leq y/(x+y) \leq 0.8$ $0.1 \leq a \leq 10$ where a represents a value based on one molecule of $(Al_{1-x-y}Cr_xFe_y)_2O_3$.

In one embodiment of the invention, the oxide composition includes elements in amounts represented by the following formula:

$(Al_{1-x-y}Cr_xFe_y)_2O_3 + a$ atm. % Mg+$b$ atm. % Ca $0.05 \leq x+y \leq 0.95$ $0.05 \leq y/(x+y) \leq 0.8$ $0.1 \leq a \leq 10$ $0.1 \leq b \leq 5$ where a and b represent values based on one molecule of $(Al_{1-x-y}Cr_xFe_y)_2O_3$.

In another embodiment of the invention, the oxide composition includes elements in amounts represented by the following formula:

$(Al_{1-x-y}Cr_xFe_y)_2O_3 + a$ atm. % Mg+$b$ atm. % Ca+$c_1$ atm. % rare earth elements $0.05 \leq x+y \leq 0.95$ $0.05 \leq y/(x+y) \leq 0.8$ $0.1 \leq a \leq 10$ $0.1 \leq b \leq 5$ $0.1 \leq c_1 \leq 10$ where a, b, and $c_1$ represent values based on one molecule of $(Al_{1-x-y}Cr_xFe_y)_2O_3$.

In still another embodiment of the invention, the oxide composition includes elements in amounts represented by the following formula:

$(Al_{1-x-y}Cr_xFe_y)_2O_3 + a$ atm. % Mg+$b$ atm. % Ca+$c_2$ atm. % Th $0.05 \leq x+y \leq 0.95$ $0.05 \leq y/(x+y) \leq 0.8$ $0.1 \leq a \leq 10$ $0.1 \leq b \leq 5$ $0.01 \leq c_1 \leq 10$ where a, b, and $c_2$ represent values based on one molecule of $(Al_{1-x-y}Cr_xFe_y)_2O_3$.

In still another embodiment of the invention, the oxide composition includes elements in amounts represented by the following formula:

$(Al_{1-x-y}Cr_xFe_y)_2O_3 + a$ atm. % Mg+$b$ atm. % Ca+$c_3$ atm. % Zr+$d$ atm. % Hf $0.05 \leq x+y \leq 0.95$ $0.05 \leq y/(x+y) \leq 0.8$ $0.1 \leq a \leq 10$ $0.1 \leq b \leq 5$ $0.1 \leq c_3+d \leq 30$ where a, b, $c_3$, and d represent values based on one molecule of $(Al_{1-x-y}Cr_xFe_y)_2O_3$.

Thus, the invention described herein makes possible the advantages of (1) providing an oxide composition suitably used for thermistor elements for high-temperature use; (2) providing a temperature sensor which attains a high constant B value at high temperatures and therefore has a high accuracy; (3) providing a temperature sensor which attains a high constant B value in a broad range of temperatures, in particular between 800° C. and 900° C. or 300° C. to 600° C., and therefore has a high accuracy; (4) providing a temperature sensor for high-temperature use whose resistance value has little change over time and therefore high measurement reliability; and (5) providing a temperature sensor having excellent heat-resistance.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples, with reference to the accompanying drawings.

EXAMPLE 1

In the present example, an exemplary oxide composition of the present invention and an exemplary temperature sensor of the present invention produced by using the oxide composition will be described. The oxide composition of the present example contains its respective elements in the amounts represented by the following Formula I:

$(Al_{1-x-y}Cr_xFe_y)_2O_3 + a$ atm. % Mn     I $0.05 \leq x+y \leq 0.95$ $0.05 \leq y/(x+y) \leq 0.8$ $0.1 \leq a \leq 10$ where a represents a value based on one molecule of $(Al_{1-x-y}Cr_xFe_y)_2O_3$.

The unit "atm. %" used for the amount of the added Mn is defined as the number of Mn atoms added to the number of molecules of the oxide composition (Al, Cr, Fe)$_2$O$_3$ expressed in percentage. The unit "atm. %" will be used throughout the specification as defined above. Accordingly, for example, if one atom of Mn (i.e., ⅓ molecules of Mn$_3$O$_4$) is added to 100 molecules of (Al, Cr, Fe)$_2$O$_3$, it is expressed as 1 atm. % of Mn being added.

First, predetermined amounts of Al$_2$O$_3$, Cr$_2$O$_3$, Fe$_2$O$_3$, and Mn$_3$O$_4$, such that x, y, and a in Formula I have the respective values shown in Table 1 below, were weighed out. Each set of weighed components were mixed in a ball mill for 16 hours. The resultant mixtures were calcinated at 1200° C. for 3 hours. Each calcinated mixture was placed again in a ball mill so as to be milled for 18 hours, and was dried. Next, a 5 wt % aqueous solution of polyvinyl alcohol (PVA) was added as a binder to the mixture in an amount of 10 wt % based on the weight of the mixture, so as to granulate the mixture. Next, the resultant granules were formed into the shape of the thermistor element 1 shown in FIG. 2. After inserting Pt pipes 2a and 2b into the thermistor element 1, the thermistor element 1 was sintered at 1600° C. for 5 hours. Thus, thermistor elements composed of the oxide composition of the present invention were obtained. In the present specification, an "oxide composition" is defined as a composition containing a plurality of oxides. The "oxide composition" includes those resulting from one or more oxides being deposited in the grain boundaries of a composition composed of another oxide(s). Therefore, the oxide composition does not need to be of a homogeneous structure, and is not limited to any specific structure.

Temperature sensors (Sample Nos. 1 to 14) having the configuration shown in FIG. 1 were produced by using the above thermistor element 1 and the Pt pipes 2a and 2b, the Pt pipes 2a and 2b functioning as electrodes. As shown in FIG. 1, a heat-resistant cap 5 and a dual-core tube 3 composed of SUS310S (stainless steel), which is a heat-resistant material, were used. The resistance values of the temperature sensors at 800° C. and 900° C. (represented as R800 and R900 in Table 1, respectively) were measured, and the constant B in the temperature range of 800° C. to 900° C. was derived in accordance with Equation 1. R800, R900, and the resultant constant B values are shown in Table 1 below.

TABLE 1

| Sample No. | $(Al_{1-x-y}Cr_xFe_y)_2O_3$ + a atm. % Mn | | | | | |
|---|---|---|---|---|---|---|
| | Composition | | | Resistance (Ω) | | |
| | x | y | a | R800 | R900 | Constant B |
| 1 | 0.2 | 0.1 | 0.1 | 2020 | 1200 | 6556 |
| 2 | 0.2 | 0.1 | 0.5 | 2360 | 1290 | 7604 |
| 3 | 0.2 | 0.1 | 1.0 | 2560 | 1380 | 7779 |
| 4 | 0.2 | 0.1 | 3.0 | 1990 | 1010 | 8538 |
| 5 | 0.2 | 0.1 | 5.0 | 230 | 140 | 6249 |
| 6 | 0.2 | 0.1 | 10.0 | 70 | 43 | 6134 |
| 7 | 0.2 | 0.1 | 20.0 | 40 | 30 | 6321 |
| 8 | 0.2 | 0.1 | 0.0 | 1200 | 820 | 4794 |
| 9 | 0.04 | 0.01 | 1.0 | 25600 | 10400 | 11340 |
| 10 | 0.125 | 0.5 | 0.1 | 210 | 110 | 8140 |
| 11 | 0.9 | 0.05 | 1.0 | 290 | 190 | 5324 |
| 12 | 0.5 | 0.1 | 5.0 | 565 | 335 | 6580 |
| 13 | 0.7 | 0.2 | 0.5 | 440 | 280 | 5690 |
| 14 | 0.3 | 0.4 | 0.5 | 570 | 350 | 7268 |

As seen from Table 1, according to the present invention, the constant B in high-temperature regions can be increased by adding a predetermined amount of Mn to (Al, Cr, Fe)$_2$O$_3$. It is considered that the addition of an appropriate amount of Mn serves to control the resistance value of the thermistor element to be within an appropriate range, thereby resulting in a high constant B value. Sample No. 7, to which more than 10 atm. % of Mn was added, and Sample No. 8, to which no Mn was added, both had low constant B values.

EXAMPLE 2

An exemplary oxide composition of the present invention and an exemplary temperature sensor of the present invention produced by using the oxide composition will be described. The oxide composition of the present example contains its respective elements in the amounts represented by the following Formula II:

$(Al_{1-x-y}Cr_xFe_y)_2O_3 + a$ atm. % Mn+$b$ atm. % Ca     II $0.05 \leq x+y \leq 0.95$ $0.05 \leq y/(x+y) \leq 0.8$ $0.1 \leq a \leq 10$ $0.1 \leq b \leq 5$ where a and b represent values based on one molecule of $(Al_{1-x-y}Cr_xFe_y)_2O_3$.

First, predetermined amounts of $Al_2O_3$, $Cr_2O_3$, $Fe_2O_3$, $Mn_3O_4$, and $CaCO_3$, such that x, y, a, and b in Formula II have the respective values shown in Table 2 below, were weighed out. Thermistor elements and temperature sensors (Sample Nos. 15 to 26) were produced in the same manner as in Example 1. The resistance values of the temperature sensors at 800° C. and 900° C. (represented as R800 and R900 in Table 2, respectively) were measured, and the constant B in the temperature range of 800° C. to 900° C. was derived in accordance with Equation 1. R800, R900, and the resultant constant B values are shown in Table 2 below. Next, a 1000 hour endurance test at 900° C. was conducted, after which the resistance values of the temperature sensors at 800° C. were measured. The change rate over time (hereinafter referred to as "change rate") of the resistance value of each temperature sensor was derived in accordance with Equation 2 shown below. The resultant change rates are shown in Table 2 as ΔR800 (900° C.).

$$\text{Change rate } (\%) = (R_A/R_I) \times 100 \qquad \text{Eq. 2}$$

where $R_A$ represents a resistance value after the endurance test; and $R_I$ represents an initial resistance value.

It is preferable that the change rate of the resistance value is within the range of ±20% in terms of the actual use of the temperature sensor.

mistor element becomes porous; as a result, oxygen becomes more likely to be freed from the thermistor element, thereby increasing the change rate of the resistance value to be over ±20%. On the other hand, the thermistor element does not become dense enough if the added amount of Ca is less than 0.1 atm. % as Sample No. 15. As a result, it becomes difficult to keep the change rate within ±20%.

EXAMPLE 3

An exemplary oxide composition of the present invention and an exemplary temperature sensor of the present invention produced by using the oxide composition will be described. The oxide composition of the present example contains its respective elements in the amounts represented by the following Formula III:

$(Al_{1-x-y}Cr_xFe_y)_2O_3 + a$ atm. % Mn+$b$ atm. % Ca+$c_1$ atm. % RE   III $0.05 \leq x+y \leq 0.95$ $0.05 \leq y/(x+y) \leq 0.8$ $0.1 \leq a \leq 10$ $0.1 \leq b \leq 5$ $0.1 \leq c_1 \leq 10$ where a, b, and $c_1$ represent values based on one molecule of $(Al_{1-x-y}Cr_xFe_y)_2O_3$. In the above Formula III and hereinafter, RE represents a rare earth element.

First, predetermined amounts of $Al_2O_3$, $Cr_2O_3$, $Fe_2O_3$, $Mn_3O_4$, $CaCO_3$, and rare earth oxides such that x, y, a, b, and

TABLE 2

$(Al_{1-x-y}Cr_xFe_y)_2O_3$ + a atm. % Mn + b atm. % Ca

| Sample No. | Composition | | | | Resistance (Ω) | | | Change Rate Δ800 |
|---|---|---|---|---|---|---|---|---|
| | x | y | a | b | R800 | R900 | Constant B | (900° C.) |
| 15 | 0.2 | 0.1 | 0.1 | 0 | 2020 | 1200 | 6556 | +41 |
| 16 | 0.2 | 0.1 | 0.1 | 0.1 | 2040 | 1210 | 6575 | +19 |
| 17 | 0.2 | 0.1 | 0.1 | 1.0 | 2050 | 1210 | 6637 | +14 |
| 18 | 0.2 | 0.1 | 0.1 | 5.0 | 2100 | 1240 | 6632 | +12 |
| 19 | 0.2 | 0.1 | 0.1 | 10.0 | 3420 | 2000 | 6754 | +59 |
| 20 | 0.04 | 0.01 | 1.0 | 0.5 | 25600 | 10300 | 11462 | +12 |
| 21 | 0.3 | 0.5 | 2 | 5.0 | 330 | 220 | 5104 | +7 |
| 22 | 0.3 | 0.4 | 20 | 3.0 | 420 | 310 | 3823 | +92 |
| 23 | 0.5 | 0.1 | 5 | 4.0 | 555 | 330 | 6545 | +17 |
| 24 | 0.9 | 0.05 | 1 | 2.0 | 280 | 180 | 5562 | +18 |
| 25 | 0.125 | 0.5 | 0.1 | 5.0 | 200 | 110 | 7526 | +15 |
| 26 | 0.2 | 0.2 | 1 | 3.0 | 340 | 210 | 6066 | +8 |

As seen from Table 2, the addition of the predetermined amounts of Ca reduces the change rate of the resistance value. This is considered to be because the thermistor elements become dense by the addition of Ca, so that the surface area of each thermistor element decreases, thereby preventing oxygen from being freed from the thermistor element due to a reducing gas released from the inner wall of the heat-resistant cap when the temperature sensor is used at a high temperature. It is considered that the added Ca does not form a solid solution with the main component represented by Formula I, but is deposited as CaO in the grain boundaries.

It is considered that, if the amount of the added Ca exceeds 5 atm. % as in Sample No. 19 in Table 2, the Ca is vaporized during the sintering, so that the resultant ther- $c_1$ in Formula III have the respective values shown in Table 3 below, were weighed out. The rare earth oxides used herein were $Y_2O_3$, $La_2O_3$, $CeO_2$, $Pr_6O_{11}$, $Nd_2O_3$, $Sm_2O_3$, $Eu_2O_3$, $Gd_2O_3$, $Tb_4O_7$, $Dy_2O_3$, $Ho_2O_3$, $Er_2O_3$, $Tm_2O_3$, $Yb_2O_3$, and $Lu_2O_3$. The rare earth oxides used for the respective samples are also specified in Table 3 below. Thermistor elements and temperature sensors (Sample Nos. 27 to 60) were produced in the same manner as in Example 1. The resistance values of the temperature sensors at 800° C. and 900° C. (represented as R800 and R900 in Table 3, respectively) were measured, and the constant B in the temperature range of 800° C. to 900° C. was derived in accordance with Equation 1. R800, R900, and the resultant constant values B are shown in Table 3 below. Next, a 150 hour endurance test at 1000° C. was conducted, after which the resistance values of the temperature sensors at 800° C. were measured. The change rates of the resistance values of the temperature sensors were derived in accordance with Equation 2 shown above. The resultant change rates are shown in Table 3 as ΔR800 (1000° C.).

ing the segregation amount of (RE)CrO$_3$ having a perovskite structure; as a result, the semiconductor characteristics become off-balanced, causing the change rate of the resistance value thereof to exceed ±20%.

TABLE 3

$(Al_{1-x-y}Cr_xFe_y)_2O_3$ + a % Mn b atm. % Ca + $c_1$ atm. % RE

| Sample No. | Composition | | | | | | Resistance (Ω) | | | Change Rate ΔR800 (1000° C.) |
|---|---|---|---|---|---|---|---|---|---|---|
| | x | y | a | b | RE | $c_1$ | R800 | R900 | Constant B | |
| 27 | 0.2 | 0.1 | 0.1 | 5 |  | 0.0 | 2100 | 1240 | 6632 | +52 |
| 28 | 0.2 | 0.1 | 0.1 | 5 | Y | 0.1 | 2120 | 1240 | 6752 | +18 |
| 29 | 0.2 | 0.1 | 0.3 | 1 | Y | 10 | 1990 | 1020 | 8414 | +13 |
| 30 | 0.2 | 0.1 | 0.3 | 2 | Y | 20 | 2000 | 1030 | 8354 | +48 |
| 31 | 0.04 | 0.01 | 1.0 | 0.5 | La | 7 | 26300 | 12300 | 9567 | +11 |
| 32 | 0.5 | 0.1 | 5.0 | 5 | La | 9 | 550 | 340 | 6055 | +10 |
| 33 | 0.9 | 0.05 | 1.0 | 2 | Ce | 2 | 280 | 170 | 6282 | +7 |
| 34 | 0.3 | 0.4 | 10.0 | 3 | Ce | 5 | 480 | 280 | 6785 | +11 |
| 35 | 0.2 | 0.2 | 0.7 | 4 | Pr | 7 | 390 | 220 | 7207 | +18 |
| 36 | 0.3 | 0.3 | 0.4 | 2 | Pr | 2 | 380 | 240 | 5785 | +10 |
| 37 | 0.125 | 0.5 | 2.5 | 1 | Nd | 3 | 250 | 120 | 9240 | +11 |
| 38 | 0.3 | 0.5 | 0.1 | 0.1 | Nd | 4 | 390 | 240 | 6112 | +12 |
| 39 | 0.2 | 0.2 | 0.7 | 2 | Sm | 5 | 360 | 220 | 6200 | +10 |
| 40 | 0.7 | 0.2 | 0.5 | 3 | Sm | 1 | 420 | 270 | 5562 | +12 |
| 41 | 0.3 | 0.4 | 0.4 | 2 | Eu | 4 | 520 | 320 | 6112 | +8 |
| 42 | 0.3 | 0.4 | 0.2 | 7 | Eu | 3 | 540 | 320 | 6587 | +37 |
| 43 | 0.1 | 0.2 | 0.5 | 1 | Eu | 5 | 450 | 280 | 5973 | +8 |
| 44 | 0.2 | 0.4 | 8.0 | 1 | Eu | 10 | 320 | 210 | 5302 | +13 |
| 45 | 0.2 | 0.1 | 3.0 | 2 | Gd | 3 | 1900 | 1060 | 7347 | +8 |
| 46 | 0.6 | 0.1 | 0.2 | 0 | Gd | 7 | 720 | 350 | 9081 | +51 |
| 47 | 0.6 | 0.2 | 3.0 | 2 | Tb | 9 | 200 | 100 | 8726 | +10 |
| 48 | 0.03 | 0.02 | 0.5 | 1.5 | Dy | 2 | 26860 | 10530 | 11789 | +7 |
| 49 | 0.3 | 0.4 | 3.0 | 3 | Dy | 5 | 420 | 250 | 6531 | +11 |
| 50 | 0.2 | 0.1 | 5.0 | 4 | Ho | 7 | 2200 | 1240 | 7218 | +14 |
| 51 | 0.15 | 0.15 | 0.4 | 2 | Ho | 2 | 400 | 250 | 5917 | +10 |
| 52 | 0.04 | 0.01 | 0.6 | 1 | Er | 3 | 26000 | 13500 | 8251 | +11 |
| 53 | 0.5 | 0.1 | 0.1 | 3 | Er | 4 | 1630 | 980 | 6171 | +12 |
| 54 | 0.2 | 0.1 | 0.7 | 2 | Tm | 5 | 810 | 520 | 5579 | +10 |
| 55 | 0.6 | 0.2 | 3.5 | 3 | Tm | 1 | 750 | 320 | 10723 | +12 |
| 56 | 0.9 | 0.05 | 1.4 | 2 | Yb | 4 | 280 | 170 | 6282 | +8 |
| 57 | 0.2 | 0.5 | 2.0 | 1 | Yb | 3 | 190 | 110 | 6880 | +17 |
| 58 | 0.2 | 0.1 | 0.5 | 1 | Lu | 2 | 230 | 140 | 6249 | +13 |
| 59 | 0.3 | 0.4 | 10.0 | 1 | Lu | 2 | 520 | 320 | 6112 | +18 |
| 60 | 0.1 | 0.05 | 0.4 | 2 | Lu | 1 | 10100 | 6200 | 6143 | +12 |

As seen from Table 3, the addition of the rare earth elements as well as the predetermined amount of Ca improves the heat-resistance of the thermistor element. For example, the change rates of the resistance values of the temperature sensor according to the present example were within ±20% even after the 150 hour endurance test at 1000° C. conducted in an enclosed state in the heat resistance caps 5. It is considered that this effect is obtained because the addition of Ca makes the resultant thermistor element dense, thereby preventing oxygen from being freed from the thermistor element, and because the rare earth oxides are deposited in the grain boundaries as (RE)CrO$_3$, thereby reducing the diffusion of any reducing gas into the thermistor element so as to prevent the resistance value from changing.

It is considered that, if the amount of the added Ca exceeds 5 atm. % as in Sample No. 42 in Table 3, the Ca is vaporized during the sintering, so that the resultant thermistor element becomes porous; as a result, the thermistor element becomes more likely to be affected by the ambient atmosphere, causing the change rate of the resistance value thereof to exceed ±20%. It is further considered that, if the amount of the added rare earth element exceeds 10 atm. % as in Sample No. 30, a large amount of Cr is lost from the main component represented by Formula I, thereby increas- Sample 27 shown in Table 3 includes no rare earth elements, that is, it has the same composition as that of Sample No. 18 of Example 2. Although this sample had a change rate of only +12% when a 1000 hour endurance test at 900° C. was conducted as in Example 2, the change rate exceeded ±20% when the 150 hour endurance test at 1000° C. was conducted in accordance with the present example. As will be appreciated, the addition of 0.1 atm. % of rare earth element results in satisfactory values of the constant B and the change rate when conducting an endurance test at 900° C., but does not provide sufficient heat-resistance at higher temperatures. Sample No. 46 includes no Ca. The change rate of Sample No. 46 also exceeded ±20%. Thus, the heat-resistance at high temperatures decreases when the added amount of either Ca or rare earth element becomes smaller than 0.1 atm. %.

EXAMPLE 4

An exemplary oxide composition of the present invention and an exemplary temperature sensor of the present invention produced by using the oxide composition will be described. The oxide composition of the present example contains its respective elements in the amounts represented by the following Formula IV:

$(Al_{1-x-y}Cr_xFe_y)_2O_3$+$a$ atm. % Mn+$b$ atm. % Ca+$c_2$ atm. % Th   IV $0.05 \leq x+y \leq 0.95$ $0.05 \leq y/(x+y) \leq 0.8$ $0.1 \leq a \leq 10$ $0.1 \leq b \leq 5$ $0.01 \leq c_2 \leq 10$ where a, b, and $c_2$ represent values based on one molecule of $(Al_{1-x-y}Cr_xFe_y)_2O_3$.

First, predetermined amounts of $Al_2O_3$, $Cr_2O_3$, $Fe_2O_3$, $Mn_3O_4$, $CaCO_3$, and $ThO_2$, such that x, y, a, b, and $c_2$ in Formula IV have the respective values shown in Table 4 below, were weighed out. Thermistor elements and temperature sensors (Sample Nos. 61 to 70) were produced in the same manner as in Example 1. The resistance values of the temperature sensors at 800° C. and 900° C. (represented as R800 and R900 in Table 4, respectively) were measured, and the constant B in the temperature range of 800° C. to 900° C. was derived in accordance with Equation 1. R800, R900, and the resultant constant values B are shown in Table 4 below. Next, as in Example 3, a 150 hour endurance test at 1000° C. was conducted, after which the resistance values of the temperature sensors at 800° C. were measured. The change rates of the resistance values of the temperature sensors were derived in accordance with Equation 2 shown above. The resultant change rates are shown in Table 4 as ΔR800 (1000° C.).

as in Sample No. 70, it becomes difficult to obtain a dense oxide composition. As a result, it becomes difficult to reduce the change rate of the resistance value to be within ±20%.

EXAMPLE 5

An exemplary oxide composition of the present invention and an exemplary temperature sensor of the present invention produced by using the oxide composition will be described. The oxide composition of the present example contains its respective elements in the amounts represented by the following Formula V:

$(Al_{1-x-y}Cr_xFe_y)_2O_3$+$a$ atm. % Mn+$b$ atm. % Ca+$c_3$ atm. % Zr   V $0.05 \leq x+y \leq 0.95$ $0.05 \leq y/(x+y) \leq 0.8$ $0.1 \leq a \leq 10$ $0.1 \leq b \leq 5$ $0.1 \leq c_3 \leq 30$ where a, b, and $c_3$ represent values based on one molecule of $(Al_{1-x-y}Cr_xFe_y)_2O_3$.

First, predetermined amounts of $Al_2O_3$, $Cr_2O_3$, $Fe_2O_3$, $Mn_3O_4$, $CaCO_3$, and $ZrO_2$, such that x, y, a, b, and $c_3$ in Formula V have the respective values shown in Table 5 below, were weighed out. Thermistor elements and tempera-

TABLE 4

$(Al_{1-x-y}Cr_xFe_y)_2O_3$ + $a$ atm. % Mn + $b$ atm. % Ca + $c_2$ atm. % Th

| Sample No. | Composition | | | | | Resistance (Ω) | | | Change Rate ΔR800 (1000° C.) |
|---|---|---|---|---|---|---|---|---|---|
| | x | y | a | b | $c_2$ | R800 | R900 | Constant B | |
| 61 | 0.2 | 0.1 | 0.1 | 2 | 0.1 | 2320 | 1220 | 8091 | +9 |
| 62 | 0.2 | 0.1 | 0.5 | 4 | 3 | 2420 | 1290 | 7920 | +13 |
| 63 | 0.04 | 0.01 | 3.0 | 1 | 0.01 | 25800 | 10500 | 11318 | +13 |
| 64 | 0.5 | 0.1 | 5 | 5 | 0.5 | 550 | 330 | 6431 | +8 |
| 65 | 0.125 | 0.5 | 0.1 | 5 | 0.2 | 190 | 100 | 8080 | +7 |
| 66 | 0.9 | 0.05 | 1.5 | 1 | 10 | 280 | 180 | 5562 | +8 |
| 67 | 0.2 | 0.1 | 10.0 | 5 | 0 | 80 | 50 | 5917 | +35 |
| 68 | 0.5 | 0.1 | 4 | 5 | 7 | 560 | 320 | 7045 | +13 |
| 69 | 0.2 | 0.2 | 0.5 | 3 | 0.7 | 330 | 220 | 5104 | +8 |
| 70 | 0.2 | 0.1 | 0.9 | 0.7 | 16 | 2720 | 1400 | 8361 | +74 |

As seen from Table 4, the addition of Th as well as the predetermined amount of Ca improves the heat-resistance of the thermistor element, as does the rare earth element described in Example 3. It is considered that this effect is obtained because Th, as well as Ca, does not form a solid solution with the main component represented by Formula I, but is deposited as $ThO_2$ in the grain boundaries. Moreover, since $ThO_2$ is stable in a reducing atmosphere, Th achieves a similar heat-resistance improving effect in an amount of about 1/10 of rare earth elements.

Sample 67 shown in Table 4 includes no Th. Although Sample 67 has the composition of the oxide composition of the present invention as expressed by Formula II, it does not have sufficient heat-resistance at high temperatures since no Th is added. If the added amount of Th exceeds 10 atm. %, ture sensors (Sample Nos. 71 to 83) were produced in the same manner as in Example 1. The resistance values of the temperature sensors at 800° C. and 900° C. (represented as RS800 and R900 in Table 5, respectively) were measured, and the constant B in the temperature range of 800° C. to 900° C. was derived in accordance with Equation 1. R800, R900, and the resultant constant values B are shown in Table 5 below. Next, as in Example 3, a 150 hour endurance test at 1000° C. was conducted, after which the resistance values of the temperature sensors at 800° C. were measured. The change rates of the resistance values of the temperature sensors were derived in accordance with Equation 2 shown above. The resultant change rates are shown in Table 5 as ΔR800 (1000° C.).

TABLE 5

$(Al_{1-x-y}Cr_xFe_y)_2O_3 +$ a atm. % Mn + b atm. % Ca + $c_2$ atm. % Zr

| Sample No. | Composition | | | | | Resistance (Ω) | | | Change Rate ΔR800 |
|---|---|---|---|---|---|---|---|---|---|
| | x | y | a | b | $c_2$ | R800 | R900 | Constant B | (1000° C.) |
| 71 | 0.2 | 0.1 | 0.1 | 0.1 | 0.1 | 2030 | 1220 | 6410 | +12 |
| 72 | 0.2 | 0.1 | 0.1 | 0.1 | 1 | 3210 | 1900 | 6602 | +12 |
| 73 | 0.2 | 0.1 | 0.1 | 0.1 | 10 | 4800 | 2730 | 7104 | +16 |
| 74 | 0.2 | 0.1 | 0.1 | 0.1 | 30 | 6250 | 3520 | 7227 | +19 |
| 75 | 0.04 | 0.01 | 5.0 | 2 | 10 | 32420 | 13200 | 11312 | +12 |
| 76 | 0.5 | 0.1 | 10.0 | 2 | 30 | 1300 | 820 | 5801 | +15 |
| 77 | 0.2 | 0.1 | 0.1 | 5 | 0 | 2100 | 1240 | 6632 | +52 |
| 78 | 0.9 | 0.05 | 1.0 | 2 | 7.5 | 380 | 240 | 5785 | +14 |
| 79 | 0.3 | 0.5 | 2.5 | 5 | 10 | 410 | 260 | 5734 | +12 |
| 80 | 0.5 | 0.1 | 0.5 | 1 | 10 | 1100 | 700 | 5690 | +7 |
| 81 | 0.125 | 0.5 | 0.1 | 1.5 | 0.1 | 220 | 110 | 7631 | +8 |
| 82 | 0.04 | 0.01 | 7.0 | 3.5 | 5 | 31460 | 15340 | 9042 | +15 |
| 83 | 0.3 | 0.4 | 0.1 | 4 | 40 | 630 | 450 | 4236 | +91 |

As seen from Table 5, the addition of Zr as well as the predetermined amount of Ca improves the heat-resistance of the thermistor element, as do the rare earth element described in Example 3 and the Th described in Example 4. Sample 77 shown in Table 5, which includes no Zr and has the same composition as that of Sample No. 18 of Example 2, does not have sufficient heat-resistance at high temperatures. If the added amount of Zr exceeds 30 atm. %, as in Sample No. 83, it becomes difficult to obtain a dense oxide composition. As a result, it becomes difficult to reduce the change rate of the resistance value to be within ±20%.

Moreover, assuming that the composition represented by Formula I is the same, the resistance value of the temperature sensor can be controlled within a wide range by adjusting the amount of Zr to be added.

EXAMPLE 6

An exemplary oxide composition of the present invention and an exemplary temperature sensor of the present invention produced by using the oxide composition will be described. The oxide composition of the present example contains its respective elements in the amounts represented by the following Formula VI:

$(Al_{1-x-y}Cr_xFe_y)_2O_3 + a$ atm. % Mg      VI $0.05 \leq x+y \leq 0.95$ $0.05 \leq y/(x+y) \leq 0.8$ $0.1 \leq a \leq 10$ where a represents a value based on one molecule of $(Al_{1-x-y}Cr_xFe_y)_2O_3$.

First, predetermined amounts of $Al_2O_3$, $Cr_2O_3$, $Fe_2O_3$, and MgO, such that x, y, and a in Formula VI have the respective values shown in Table 6 below, were weighed out. Thermistor elements and temperature sensors (Sample Nos. 84 to 97) were produced in the same manner as in Example 1. The resistance values of the temperature sensors at 300° C. and 600° C. (represented as R300 and R600 in Table 6, respectively) were measured, and the constant B in the temperature range of 300° C. to 600° C. was derived in accordance with Equation 1. R300, R600, and the resultant constant values B are shown in Table 6 below.

TABLE 6

$(Al_{1-x-y}Cr_xFe_y)_2O_3 + a$ atm. % Mg

| Sample No. | Composition | | | Resistance (Ω) | | |
|---|---|---|---|---|---|---|
| | x | y | a | R300 | R600 | Constant B |
| 84 | 0.2 | 0.1 | 0.1 | 202.00 | 2.142 | 7585 |
| 85 | 0.2 | 0.1 | 0.5 | 102.00 | 0.573 | 8645 |
| 86 | 0.2 | 0.1 | 1.0 | 130.10 | 0.528 | 9187 |
| 87 | 0.2 | 0.1 | 3.0 | 61.31 | 0.430 | 8274 |
| 88 | 0.2 | 0.1 | 5.0 | 49.56 | 0.384 | 8109 |
| 89 | 0.2 | 0.1 | 10.0 | 31.42 | 0.323 | 7636 |
| 90 | 0.2 | 0.1 | 20.0 | 13.05 | 0.710 | 4857 |
| 91 | 0.2 | 0.1 | 0.0 | 491.40 | 30.32 | 4647 |
| 92 | 0.04 | 0.01 | 1.0 | 9860.0 | 105.4 | 7572 |
| 93 | 0.125 | 0.5 | 0.1 | 2.31 | 0.035 | 6989 |
| 94 | 0.9 | 0.05 | 1.0 | 1.56 | 0.016 | 7641 |
| 95 | 0.5 | 0.1 | 5.0 | 10.49 | 0.098 | 7496 |
| 96 | 0.7 | 0.2 | 0.5 | 2.23 | 0.025 | 7492 |
| 97 | 0.3 | 0.4 | 0.5 | 4.26 | 0.073 | 6784 |

As seen from Table 6, the addition of the predetermined amount of Mg to the (Al, Cr, Fe)$_2$O$_3$ increases the constant B value in a medium-temperature range, e.g., 300° C. to 600° C. It is considered that the addition of an appropriate amount of Mg serves to control the resistance value to be within an appropriate range, thereby providing a high constant B value. It is further considered that depositions having a spinel structure [Mg (Al, Cr, Fe)$_2$O$_4$] increases as the added amount of Mg exceeds 10 atm. %, thereby increasing the change in the resistance value. Sample No. 90, to which more than 10 atm. % of Mg was added, and Sample No. 91, to which no Mg was added, both had low constant B values.

EXAMPLE 7

An exemplary oxide composition of the present invention and an exemplary temperature sensor of the present invention produced by using the oxide composition will be described. The oxide composition of the present example contains its respective elements in the amounts represented by the following Formula VII:

$(Al_{1-x-y}Cr_xFe_y)_2O_3 + a$ atm. % Mg + $b$ atm. % Ca     VII $0.05 \leq x+y \leq 0.95$ $0.05 \leq y/(x+y) \leq 0.8$ $0.1 \leq a \leq 10$ $0.1 \leq b \leq 5$ where a and b represent values based on one molecule of $(Al_{1-x-y}Cr_xFe_y)_2O_3$.

First, predetermined amounts of $Al_2O_3$, $Cr_2O_3$, $Fe_2O_3$, MgO, and $CaCO_3$, such that x, y, a, and b in Formula VII have the respective values shown in Table 7 below, were weighed out. Thermistor elements and temperature sensors (Sample Nos. 98 to 109) were produced in the same manner as in Example 1. The resistance values of the temperature sensors at 300° C. and 600° C. (represented as R300 and R600 in Table 7, respectively) were measured, and the constant B in the temperature range of 300° C. to 600° C. was derived in accordance with Equation 1. R300, R600, and the resultant constant values B are shown in Table 7 below. Next, a 1000 hour endurance test at 900° C. was conducted, after which the resistance values of the temperature sensors at 600° C. were measured. The change rates of the resistance values of the temperature sensors were derived in accordance with Equation 2 shown above. The resultant change rates are shown in Table 7 as ΔR600 (900° C.).

EXAMPLE 8

An exemplary oxide composition of the present invention and an exemplary temperature sensor of the present invention produced by using the oxide composition will be described. The oxide composition of the present example contains its respective elements in the amounts represented by the following Formula VIII:

$(Al_{1-x-y}Cr_xFe_y)_2O_3 + a$ atm. % $Mg + b$ atm. % $Ca + c_1$ atm. % RE VIII $0.05 \leq x+y \leq 0.95$ $0.05 \leq y/(x+y) \leq 0.8$ $0.1 \leq a \leq 10$ $0.1 \leq b \leq 5$ $0.1 \leq c_1 \leq 10$ where a, b, and $c_1$ represent values based on one molecule of $(Al_{1-x-y}Cr_xFe_y)_2O_3$.

First, predetermined amounts of $Al_2O_3$, $Cr_2O_3$, $Fe_2O_3$,

TABLE 7

$(Al_{1-x-y}Cr_xFe_y)_2O_3 + a$ atm. % Mg + b atm. % Ca

| Sample No. | Composition | | | | Resistance (Ω) | | | Change Rate ΔR600 |
|---|---|---|---|---|---|---|---|---|
| | x | y | a | b | R300 | R600 | Constant B | (900° C.) |
| 98 | 0.2 | 0.1 | 0.1 | 0 | 202.00 | 2.142 | 7585 | +44 |
| 99 | 0.2 | 0.1 | 0.1 | 0.1 | 202.40 | 2.110 | 7614 | +19 |
| 100 | 0.2 | 0.1 | 0.1 | 1.0 | 203.50 | 2.210 | 7523 | +13 |
| 101 | 0.2 | 0.1 | 0.1 | 5.0 | 203.04 | 2.240 | 7519 | +17 |
| 102 | 0.2 | 0.1 | 0.1 | 10.0 | 214.50 | 2.304 | 7564 | +53 |
| 103 | 0.04 | 0.01 | 1.0 | 0.5 | 9875.0 | 107.4 | 7542 | +15 |
| 104 | 0.3 | 0.5 | 2 | 5.0 | 3.31 | 0.056 | 6806 | +11 |
| 105 | 0.3 | 0.4 | 10 | 3.0 | 1.62 | 0.043 | 6054 | +18 |
| 106 | 0.5 | 0.1 | 5 | 4.0 | 10.84 | 0.090 | 7993 | +7 |
| 107 | 0.9 | 0.05 | 1 | 2.0 | 1.65 | 0.016 | 7734 | +16 |
| 108 | 0.125 | 0.5 | 0.1 | 5.0 | 2.57 | 0.038 | 7030 | +15 |
| 109 | 0.2 | 0.2 | 1 | 3.0 | 19.03 | 0.152 | 8058 | +16 |

As seen from Table 7, the addition of the predetermined amount of Ca decreases the change rate of the resistance value. This is considered to be because the thermistor elements become dense by the addition of Ca, so that the surface area of each thermistor element decreases, thereby preventing oxygen from being freed from the thermistor element due to a reducing gas released from the inner wall of the heat-resistant cap when the temperature sensor is used at a high temperature. It is considered that the added Ca does not form a solid solution with the main component represented by Formula VI, but is deposited as CaO in the grain boundaries.

It is considered that, if the amount of the added, Ca exceeds 5 atm. % as in Sample No. 102 in Table 7, the Ca is vaporized during the sintering, so that the resultant thermistor element becomes porous; as a result, oxygen becomes more likely to be freed from the thermistor element, thereby increasing the change rate of the resistance value to be over ±20%. On the other hand, the thermistor element does not become dense enough if the added amount of Ca is less than 0.1 atm. % as Sample No. 98. As a result, it becomes difficult to keep the change rate within ±20%.

MgO, $CaCO_3$, and rare earth oxides such that x, y, a, b, and $c_1$ in Formula VIII have the respective values shown in Table 8 below, were weighed out. The rare earth oxides used herein were $Y_2O_3$, $La_2O_3$, $CeO_2$, $Pr_6O_{11}$, $Nd_2O_3$, $Sm_2O_3$, $Eu_2O_3$, $Gd_2O_3$, $Tb_4O_7$, $Dy_2O_3$, $Ho_2O_3$, $Er_2O_3$, $Tm_2O_3$, $Yb_2O_3$, and $Lu_2O_3$. The rare earth oxides used for the respective samples are also specified in Table 8 below. Thermistor elements and temperature sensors (Sample Nos. 110 to 143) were produced in the same manner as in Example 1. The resistance values of the temperature sensors at 300° C. and 600° C. (represented as R300 and R600 in Table 8, respectively) were measured, and the constant B in the temperature range of 300° C. to 600° C. was derived in accordance with Equation 1. R300, R600, and the resultant constant values B are shown in Table 8 below. Next, a 150 hour endurance test at 1000° C. was conducted, after which the resistance values of the temperature sensors at 600° C. were measured. The change rates of the resistance values of the temperature sensors were derived in accordance with Equation 2 shown above. The resultant change rates are shown in Table 8 as ΔR600 (1000° C.).

TABLE 8

$(Al_{1-x-y}Cr_xFe_y)_2O_3 + a\ \%\ Mg + b\ atm.\ \%\ Ca + c_1\ atm.\ \%\ RE$

| Sample No. | Composition x | y | a | b | RE | $c_1$ | Resistance (Ω) R300 | R600 | Constant B | Change Rate ΔR600 (1000° C.) |
|---|---|---|---|---|---|---|---|---|---|---|
| 110 | 0.2 | 0.1 | 0.1 | 5 |  | 0.0 | 204.00 | 2.368 | 7434 | +33 |
| 111 | 0.2 | 0.1 | 3.0 | 2 | Y | 3 | 60.00 | 0.460 | 8126 | +8 |
| 112 | 0.6 | 0.1 | 0.2 | 0 | Y | 7 | 8.25 | 0.051 | 8485 | +51 |
| 113 | 0.6 | 0.2 | 3.0 | 2 | La | 9 | 4.43 | 0.034 | 8124 | +10 |
| 114 | 0.03 | 0.02 | 0.5 | 1.5 | La | 2 | 20860 | 205.0 | 7712 | +7 |
| 115 | 0.3 | 0.4 | 3.0 | 3 | Ce | 5 | 3.62 | 0.068 | 6531 | +11 |
| 116 | 0.2 | 0.1 | 5.0 | 4 | Ce | 7 | 52.36 | 0.420 | 8051 | +14 |
| 117 | 0.15 | 0.15 | 0.4 | 2 | Pr | 2 | 45.32 | 1.050 | 6281 | +10 |
| 118 | 0.04 | 0.01 | 0.6 | 1 | Pr | 3 | 9685.2 | 100.3 | 7625 | +11 |
| 119 | 0.5 | 0.1 | 0.1 | 3 | Nd | 4 | 13.52 | 0.103 | 8137 | +12 |
| 120 | 0.2 | 0.1 | 0.7 | 2 | Nd | 5 | 95.67 | 0.526 | 8681 | +10 |
| 121 | 0.6 | 0.2 | 3.5 | 3 | Sm | 1 | 4.39 | 0.029 | 8375 | +12 |
| 122 | 0.9 | 0.05 | 1.4 | 2 | Sm | 4 | 1.53 | 0.015 | 7716 | +8 |
| 123 | 0.2 | 0.5 | 2.0 | 5 | Eu | 3 | 4.32 | 0.076 | 6741 | +17 |
| 124 | 0.2 | 0.1 | 0.5 | 1 | Eu | 2 | 108.63 | 0.540 | 8849 | +13 |
| 125 | 0.2 | 0.1 | 0.1 | 5 | Eu | 0.1 | 202.20 | 2.350 | 7432 | +18 |
| 126 | 0.2 | 0.1 | 0.3 | 1 | Gd | 10 | 198.04 | 2.020 | 7650 | +13 |
| 127 | 0.2 | 0.1 | 0.3 | 2 | Gd | 20 | 186.23 | 1.963 | 7595 | +48 |
| 128 | 0.04 | 0.01 | 1.0 | 0.5 | Gd | 7 | 9875.2 | 106.2 | 7562 | +11 |
| 129 | 0.5 | 0.1 | 5.0 | 5 | Tb | 9 | 11.60 | 0.091 | 8088 | +10 |
| 130 | 0.9 | 0.05 | 1.0 | 2 | Tb | 2 | 1.34 | 0.015 | 7495 | +7 |
| 131 | 0.3 | 0.4 | 10.0 | 3 | Dy | 5 | 2.54 | 0.050 | 6553 | +11 |
| 132 | 0.2 | 0.2 | 0.7 | 4 | Dy | 7 | 18.56 | 0.143 | 8118 | +18 |
| 133 | 0.3 | 0.3 | 0.4 | 2 | Ho | 2 | 6.12 | 0.086 | 7115 | +10 |
| 134 | 0.125 | 0.5 | 2.5 | 1 | Ho | 3 | 3.62 | 0.043 | 6239 | +11 |
| 135 | 0.3 | 0.5 | 0.1 | 0.1 | Er | 4 | 4.63 | 0.068 | 7042 | +12 |
| 136 | 0.2 | 0.2 | 0.7 | 2 | Er | 5 | 18.32 | 0.143 | 8096 | +10 |
| 137 | 0.7 | 0.2 | 0.5 | 3 | Tm | 1 | 4.93 | 0.078 | 6918 | +12 |
| 138 | 0.3 | 0.4 | 0.4 | 2 | Tm | 4 | 4.36 | 0.079 | 6691 | +8 |
| 139 | 0.3 | 0.4 | 0.2 | 7 | Yb | 3 | 4.28 | 0.070 | 6862 | +37 |
| 140 | 0.1 | 0.2 | 0.5 | 1 | Yb | 5 | 44.36 | 0.235 | 8743 | +8 |
| 141 | 0.2 | 0.4 | 8.0 | 1 | Lu | 10 | 12.32 | 0.057 | 8969 | +8 |
| 142 | 0.3 | 0.4 | 10.0 | 1 | Lu | 2 | 2.59 | 0.035 | 7181 | +18 |
| 143 | 0.1 | 0.05 | 0.4 | 2 | Lu | 1 | 3860.6 | 56.92 | 7035 | +12 |

As seen from Table 8, the addition of the rare earth element as well as the predetermined amount of Ca improves the heat-resistance of the thermistor element. For example, the change rates of the resistance values of the temperature sensor according to the present example were within ±20% even after the 150 hour endurance test at 1000° C. conducted in an enclosed state in the heat resistance caps 5. It is considered that, as described earlier, this effect is obtained because the addition of Ca makes the resultant thermistor element dense, thereby preventing oxygen from being freed from the thermistor element, and because the rare earth oxides are deposited in the grain boundaries as $(RE)CrO_3$, thereby reducing the diffusion of any reducing gas into the thermistor element so as to prevent the resistance value from changing.

It is considered that, if the amount of the added Ca exceeds 5 atm. % as in Sample No. 139 in Table 8, the Ca is vaporized during the sintering, so that the resultant thermistor element becomes porous; as a result, the thermistor element becomes more likely to be affected by the ambient atmosphere, causing the change rate of the resistance value thereof to exceed ±20%. It is further considered that, if the amount of the added rare earth element exceeds 10 atm. % as in Sample No. 127, a large amount of Cr is lost from the main component represented by Formula VI, thereby increasing the segregation amount of $(RE)CrO_3$ having a perovskite structure; as a result, the semiconductor characteristics get off-balanced, causing the change rate of the resistance value thereof to exceed ±20%.

Sample 110 shown in Table 8 includes no rare earth elements, that is, it has the same composition as that of Sample No. 101 of Example 7. Although this sample had a change rate of only +17% when a 1000 hour endurance test at 900° C. was conducted as in Example 7, the change rate exceeded ±20% when the 150 hour endurance test at 1000° C. was conducted in accordance with the present example. As will be appreciated, the addition of 0.1 atm. % of rare earth element results in satisfactory values of the constant B and the change rate when conducting an endurance test at 900° C., but does not provide sufficient heat-resistance at higher temperatures. Sample No. 112 includes no Ca. The change rate of Sample No. 112 also exceeded ±20%. Thus, the heat-resistance at high temperatures decreases when the added amount of either Ca or rare earth element becomes smaller than 0.1 atm. %.

EXAMPLE 9

An exemplary oxide composition of the present invention and an exemplary temperature sensor of the present invention produced by using the oxide composition will be described. The oxide composition of the present example contains its respective elements in the amounts represented by the following Formula IX:

$(Al_{1-x-y}Cr_xFe_y)_2O_3+a$ atm. % Mg+$b$ atm. % Ca+$c_2$ atm. % Th   IX $0.05 \leq x+y \leq 0.95$ $0.05 \leq y/(x+y) \leq 0.8$ $0.1 \leq a \leq 10$

21

$0.1 \leq b \leq 5$ $0.01 \leq c_2 \leq 10$ where a, b, and $c_2$ represent values based on one molecule of $(Al_{1-x-y}Cr_xFe_y)_2O_3$.

First, predetermined amounts of $Al_2O_3$, $Cr_2O_3$, $Fe_2O_3$, MgO, $CaCO_3$, and $ThO_2$, such that x, y, a, b, and $c_2$ in Formula IX have the respective values shown in Table 9 below, were weighed out. Thermistor elements and temperature sensors (Sample Nos. 144 to 153) were produced in the same manner as in Example 1. The resistance values of the temperature sensors at 300° C. and 600° C. (represented as R300 and R600 in Table 9, respectively) were measured, and the constant B in the temperature range of 300° C. to 600° C. was derived in accordance with Equation 1. R300, R600, and the resultant constant values B are shown in Table 9 below. Next, as in Example 8, a 150 hour endurance test at 1000° C. was conducted, after which the resistance values of the temperature sensors at 600° C. were measured. The change rates of the resistance values of the temperature sensors were derived in accordance with Equation 2 shown above. The resultant change rates are shown in Table 9 as ΔR600 (1000° C.).

22

EXAMPLE 10

An exemplary oxide composition of the present invention and an exemplary temperature sensor of the present invention produced by using the oxide composition will be described. The oxide composition of the present example contains its respective elements in the amounts represented by the following Formula X:

$0.05 \leq x+y \leq 0.95$ $0.05 \leq y/(x+y) \leq 0.8$ $0.1 \leq a \leq 10$ $0.1 \leq b \leq 5$ $0.1 \leq c_3+d \leq 30$ where a, b, $c_3$, and d represent values based on one molecule of $(Al_{1-x-y}Cr_xFe_y)_2O_3$.

TABLE 9

$(Al_{1-x-y}Cr_xFe_y)_2O_3$ + a atm. % Mg + b atm. % Ca + $c_2$ atm. % Th

| Sample | Composition | | | | | Resistance (Ω) | | | Change Rate ΔR600 |
|---|---|---|---|---|---|---|---|---|---|
| No. | x | y | a | b | $c_2$ | R300 | R600 | Constant B | (1000° C.) |
| 144 | 0.2 | 0.1 | 0.1 | 2 | 0.1 | 205.35 | 2.126 | 7625 | +9 |
| 145 | 0.9 | 0.05 | 1.5 | 1 | 10 | 1.53 | 0.013 | 7955 | +8 |
| 146 | 0.2 | 0.1 | 10.0 | 5 | 0 | 31.65 | 0.332 | 7603 | +35 |
| 147 | 0.5 | 0.1 | 4 | 5 | 7 | 11.64 | 0.104 | 7870 | +13 |
| 148 | 0.2 | 0.1 | 0.5 | 4 | 3 | 113.69 | 0.628 | 8673 | +13 |
| 149 | 0.04 | 0.01 | 3.0 | 1 | 0.01 | 9438.6 | 100.9 | 7571 | +13 |
| 150 | 0.5 | 0.1 | 5 | 5 | 0.5 | 10.88 | 0.099 | 7840 | +8 |
| 151 | 0.125 | 0.5 | 0.1 | 5 | 0.2 | 2.65 | 0.033 | 7317 | +7 |
| 152 | 0.2 | 0.2 | 0.5 | 3 | 0.7 | 2.68 | 0.036 | 7191 | +8 |
| 153 | 0.2 | 0.1 | 0.9 | 0.7 | 16 | 210.32 | 1.935 | 7822 | +74 |

As seen from Table 9, the addition of Th as well as the predetermined amount of Ca improves the heat-resistance of the thermistor element, as does the rare earth element described in Example 8. It is considered that this effect is obtained because Th, as well as Ca, does not form a solid solution with the main component represented by Formula VI, but is deposited as $ThO_2$ in the grain boundaries. Moreover, since $ThO_2$ is stable in a reducing atmosphere, Th achieves a similar heat-resistance improving effect in an amount about 1/10 of rare earth elements.

Sample 146 shown in Table 9 includes no Th. Although Sample 146 has the composition of the oxide composition of the present invention as expressed by Formula VII, it does not have sufficient heat-resistance at high temperatures since no Th is added. If the added amount of Th exceeds 10 atm. %, as in Sample No. 153, it becomes difficult to obtain a dense oxide composition. As a result, it becomes difficult to reduce the change rate of the resistance value to be within ±20%.

First, predetermined amounts of $Al_2O_3$, $Cr_2O_3$, $Fe_2O_3$, MgO, $CaCO_3$, $ZrO_2$, and $HfO_2$, such that x, y, a, b, $c_3$, and d in Formula X have the respective values shown in Table 10 below, were weighed out. Thermistor elements and temperature sensors (Sample Nos. 154 to 166) were, produced in the same manner as in Example 1. The resistance values of the temperature sensors at 300° C. and 600° C. (represented as R300 and R600 in Table 10, respectively) were measured, and the constant B in the temperature range of 300° C. to 600° C. was derived in accordance with Equation 1. R300, R600, and the resultant constant values B are shown in Table 10 below. Next, as in Example 8, a 150 hour endurance test at 1000° C. was conducted, after which the resistance values of the temperature sensors at 600° C. were measured. The change rates of the resistance values of the temperature sensors were derived in accordance with Equation 2 shown above. The resultant change rates are shown in Table 10 as ΔR600 (1000° C.).

TABLE 10

$(Al_{1-x-y}Cr_xFe_y)_2O_3$ +
a atm. % Mg + b atm. % Ca + $c_2$ atm. % Zr + d atm. % Hf

| Sample No. | Composition | | | | | | Resistance (Ω) | | | Change Rate ΔR600 |
|---|---|---|---|---|---|---|---|---|---|---|
| | x | y | a | b | $c_2$ | d | R300 | R600 | Constant B | (1000° C.) |
| 154 | 0.2 | 0.1 | 0.1 | 0.1 | 0.1 | 0 | 202.56 | 2.098 | 7624 | +12 |
| 155 | 0.2 | 0.1 | 0.1 | 0.1 | 0.5 | 0.5 | 296.35 | 2.860 | 7742 | +12 |
| 156 | 0.2 | 0.1 | 0.1 | 0.1 | 7 | 3 | 623.80 | 4.960 | 8065 | +16 |
| 157 | 0.2 | 0.1 | 0.1 | 0.1 | 30 | 0 | 762.81 | 7.682 | 7671 | +19 |
| 158 | 0.3 | 0.5 | 2.5 | 5 | 8 | 2 | 4.12 | 0.078 | 6618 | +12 |
| 159 | 0.5 | 0.1 | 5.0 | 1 | 9 | 1 | 19.35 | 0.173 | 7870 | +7 |
| 160 | 0.125 | 0.5 | 0.1 | 1.5 | 0 | 0.1 | 2.46 | 0.035 | 7095 | +8 |
| 161 | 0.04 | 0.01 | 1.0 | 3.5 | 0.1 | 0 | 9953.2 | 11.36 | 7496 | +15 |
| 162 | 0.04 | 0.01 | 5.0 | 2 | 0 | 1 | 6442.6 | 68.96 | 7570 | +12 |
| 163 | 0.5 | 0.1 | 10.0 | 2 | 15 | 15 | 35.96 | 0.298 | 7996 | +15 |
| 164 | 0.2 | 0.1 | 0.1 | 5 | 0 | 0 | 203.04 | 2.240 | 7519 | +52 |
| 165 | 0.9 | 0.05 | 1.0 | 2 | 7.5 | 0 | 3.68 | 0.034 | 7815 | +14 |
| 166 | 0.3 | 0.4 | 0.1 | 4 | 30 | 10 | 31.52 | 0.680 | 6400 | +91 |

As seen from Table 10, the addition of Zr and Hf as well as the predetermined amount of Ca improves the heat-resistance of the thermistor element, as do the rare earth elements described in Example 8 and the Th described in Example 9. Sample 164 shown in Table 10, which includes neither Zr nor Hf and has the same composition as that of Sample No. 101 of Example 7, does not have sufficient heat-resistance at high temperatures. If the added amount of Zr+Hf exceeds 30 atm. %, as in Sample No. 166, it becomes difficult to obtain a dense oxide composition. As a result, it becomes difficult to reduce the change rate of the resistance value to be within ±20%.

Moreover, assuming that the composition represented by Formula VI is the same, the resistance value of the temperature sensor can be controlled within a wide range by adjusting the amounts of Zr and Hf to be added.

As described above, the oxide composition of the present invention is useful as a thermistor material for forming a thermistor element having a high accuracy in high-temperature regions. Although oxides were mainly used as starting materials for forming the oxide composition of the present invention in the above Examples, it is applicable to use other compounds, such as carbonates or oxalates. Furthermore, other types of oxides, e.g., FeO, $Fe_3O_4$, and $Mn_2O_3$, may also be used instead of those described in the above Examples. The oxide composition of the present invention is generally obtained, as described in the above Examples, by milling and mixing starting materials such as oxides, thereafter conducting a calcination, milling the calcinated material, adding a binder so as to granulate the material, optionally processing the granules into desired shapes, and sintering the granules. The calcination may or may not be conducted. The conditions for calcination (if at all) and sintering are not critical, so that calcination and sintering can be performed under conventional conditions generally known to those skilled in the art. For example, calcination may be performed, if at all, at a temperature of 1600° C. or less, and preferably in the range of 400° C. to 1300° C., for 1 to 100 hours, and preferably 1 to 10 hours. Sintering may be performed, for example, at a temperature in the range of 1300° C. to 1700° C., and preferably 1500° C. to 1700° C., for 1 to 100 hours, and preferably 1 to 10 hours. Examples of the binder to be used include methyl cellulose, polyethylene glycol, and the like as well as PVA used in the above Examples. Alternatively, the oxide composition of the present invention may be prepared by various other methods such as a coprecipitation method, a sol-gel method, CVD, or PVD, instead of the above-mentioned typical solid phase reaction method.

A thermistor element To be used for the temperature sensor of the present invention is generally produced by further milling The above-mentioned calcinated material, adding a binder so as to granulate the material, processing the granules into desired shapes, optionally attaching electrodes thereto, and sintering. The thermistor element may have any shape, e.g., a disk shape, a thick film, or a thin film. The thermistor element may implemented as being sealed in glass. Although Pt pipes 2a and 2b were used as the electrodes in the above Examples, Pt wires or other metal wires may also be used. Alternatively, it is applicable to provide the electrodes by methods such as printing or sputtering after sintering the thermistor element.

The temperature sensor of the present invention is produced by accommodating the thermistor element obtained in the above-mentioned manner in a heat-resistant cap and attaching lead wires to the electrodes on the thermistor elements and allowing the lead wires to extend outside the heat-resistant cap. The heat-resistant cap may be composed of an Ni—Cr alloy instead of stainless steel used in the above Examples. The lead wires may be Ni wires, for example.

Thus, according to the present invention, a predetermined amount of Mn is added to an (Al, Cr, Fe)$_2$O$_3$ type oxide of a corundum structure, whereby the constant B of the resultant oxide composition in the temperature range of 800° C. to 900° C. is increased. Alternatively, a predetermined amount of Mg is added to an (Al, Cr, Fe)$_2$O$_3$ type oxide of a corundum structure, whereby the constant B of the resultant oxide composition in the temperature range of 300° C. to 600° C. is increased. By using such an oxide composition as a thermistor material, an accurate temperature sensor which has a high constant B value in a high-temperature region covering a broad desired range is obtained according to the present invention. Moreover, a predetermined amount of Ca may be introduced in the oxide composition, whereby a highly reliable temperature sensor whose resistance value has little change over time is obtained. Furthermore, a predetermined amount of rare earth elements, Th, Zr, or Zr+Hf may be introduced in the oxide composition in addition to Ca, so as to further increase the heat-resistance of the temperature sensor.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An oxide composition comprising elements in amounts represented by the following formula:

$$(Al_{1-x-y}Cr_xFe_y)_2O_3 + a \text{ atm. \% Mn}$$

$$0.05 \leq x+y \leq 0.95$$

$$0.05 \leq y/(x+y) \leq 0.8$$

$$0.1 \leq a \leq 10$$

where a represents a value based on one molecule of $(Al_{1-x-y}Cr_xFe_y)_2O_3$.

2. An oxide composition according to claim 1 comprising elements in amounts represented by the following formula:

$$(Al_{1-x-y}Cr_xFe_y)_2O_3 + a \text{ atm. \% Mn} + b \text{ atm. \% Ca}$$

$$0.05 \leq x+y \leq 0.95$$

$$0.05 \leq y/(x+y) \leq 0.8$$

$$0.1 \leq a \leq 10$$

$$0.1 \leq b \leq 5$$

where a and b represent values based on one molecule of $(Al_{1-x-y}Cr_xFe_y)_2O_3$.

3. An oxide composition according to claim 2 comprising elements in amounts represented by the following formula:

$$(Al_{1-x-y}Cr_xFe_y)_2O_3 + a \text{ atm. \% Mn} + b \text{ atm. \% Ca} + c_1 \text{ atm. \% rare earth elements}$$

$$0.05 \leq x+y \leq 0.95$$

$$0.05 \leq y/(x+y) \leq 0.8$$

$$0.1 \leq a \leq 10$$

$$0.1 \leq b \leq 5$$

$$0.1 \leq c_1 \leq 10$$

where a, b, and $c_1$ represent values based on one molecule of $(Al_{1-x-y}Cr_xFe_y)_2O_3$.

4. An oxide composition according to claim 2 comprising elements in amounts represented by the following formula:

$$(Al_{1-x-y}Cr_xFe_y)_2O_3 + a \text{ atm. \% Mn} + b \text{ atm. \% Ca} + c_2 \text{ atm. \% Th}$$

$$0.05 \leq x+y \leq 0.95$$

$$0.05 \leq y/(x+y) \leq 0.8$$

$$0.1 \leq a \leq 10$$

$$0.1 \leq b \leq 5$$

$$0.01 \leq c_2 \leq 10$$

where a, b, and $c_2$ represent values based on one molecule of $(Al_{1-x-y}Cr_xFe_y)_2O_3$.

5. An oxide composition according to claim 2 comprising elements in amounts represented by the following formula:

$$(Al_{1-x-y}Cr_xFe_y)_2O_3 + a \text{ atm. \% Mn} + b \text{ atm. \% Ca} + c_3 \text{ atm. \% Zr}$$

$$0.05 \leq x+y \leq 0.95$$

$$0.05 \leq y/(x+y) \leq 0.8$$

$$0.1 \leq a \leq 10$$

$$0.1 \leq b \leq 5$$

$$0.1 \leq c_3 \leq 30$$

where a, b, and $c_3$ represent values based on one molecule of $(Al_{1-x-y}Cr_xFe_y)_2O_3$.

6. A temperature sensor comprising a heat-resistant cap, a thermistor element accommodated in the heat-resistant cap, and a pair of lead wires electrically connected to each other via the thermistor element and extending outside the heat-resistant cap, wherein the thermistor element comprises an oxide composition comprising elements in amounts represented by the following formula:

$$(Al_{1-x-y}Cr_xFe_y)_2O_3 + a \text{ atm. \% Mn}$$

$$0.05 \leq x+y \leq 0.95$$

$$0.05 \leq y/(x+y) \leq 0.8$$

$$0.1 \leq a \leq 10$$

where a represents a value based on one molecule of $(Al_{1-x-y}Cr_xFe_y)_2O_3$.

7. A temperature sensor according to claim 11, wherein the oxide composition comprises elements in amounts represented by the following formula:

$$(Al_{1-x-y}Cr_xFe_y)_2O_3 + a \text{ atm. \% Mn} + b \text{ atm. \% Ca}$$

$$0.05 \leq x+y \leq 0.95$$

$$0.05 \leq y/(x+y) \leq 0.8$$

$$0.1 \leq a \leq 10$$

$$0.1 \leq b \leq 5$$

where a and b represent values based on one molecule of $(Al_{1-x-y}Cr_xFe_y)_2O_3$.

8. A temperature sensor according to claim 7, wherein the oxide composition comprises elements in amounts represented by the following formula:

$$(Al_{1-x-y}Cr_xFe_y)_2O_3 + a \text{ atm. \% Mn} + b \text{ atm. \% Ca} + c_1 \text{ atm. \% rare earth elements}$$

$$0.05 \leq x+y \leq 0.95$$

$$0.05 \leq y/(x+y) \leq 0.8$$

$$0.1 \leq a \leq 10$$

$$0.1 \leq b \leq 5$$

$$0.1 \leq c_1 \leq 10$$

where a, b, and $c_1$ represent values based on one molecule of $(Al_{1-x-y}Cr_xFe_y)_2O_3$.

9. A temperature sensor according to claim 7, wherein the oxide composition comprises elements in amounts represented by the following formula:

$(Al_{1-x-y}Cr_xFe_y)_2O_3 + a$ atm. % Mn + $b$ atm. % Ca + $c_2$ atm. % Th $0.05 \leq x+y \leq 0.95$ $0.05 \leq y/(x+y) \leq 0.8$ $0.1 \leq a \leq 10$ $0.1 \leq b \leq 5$ $0.01 \leq c_2 \leq 10$ where a, b, and $c_2$ represent values based on one molecule of $(Al_{1-x-y}Cr_xFe_y)_2O_3$.

10. A temperature sensor according to claim 7, wherein the oxide composition comprises elements in amounts represented by the following formula:

$(Al_{1-x-y}Cr_xFe_y)_2O_3 + a$ atm. % Mn + $b$ atm. % Ca + $c_3$ atm. % Zr $0.05 \leq x+y \leq 0.95$ $0.05 \leq y/(x+y) \leq 0.8$ $0.1 \leq a \leq 10$ $0.1 \leq b \leq 5$ $0.1 \leq c_3 \leq 30$ where a, b, and $c_3$ represent values based on one molecule of $(Al_{1-x-y}Cr_xFe_y)_2O_3$.

* * * * *

UNITED STATES PATENT AND TRADEMARK OFFICE
CERTIFICATE OF CORRECTION

PATENT NO.    : 5,644,284

DATED    : July 1, 1997

INVENTOR(S)    : Hiroki Moriwake et al.

It is certified that error appears in the above-identified patent and that said Letters Patent is hereby corrected as shown below:

Column 6, line 44, change "$0.01 \leq c_1 \geq 10$" to --$0.01 \leq c_2 \geq 10$--.

Claim 7, line 1, change "claim 11" to --claim 6--.

Signed and Sealed this

Tenth Day of February, 1998

*Attest:*

BRUCE LEHMAN

*Attesting Officer*    *Commissioner of Patents and Trademarks*